(12) United States Patent
Choi

(10) Patent No.: US 6,646,800 B2
(45) Date of Patent: Nov. 11, 2003

(54) VISUAL AND AUDIO SYSTEM FOR THEATERS

(76) Inventor: Hae-Yong Choi, Ipark Apt. 108-301, #385 Mok-2dong, Jungryang-gu, Seoul-city 131-140 (KR)

( * ) Notice: Subject to any disclaimer, the term of this patent is extended or adjusted under 35 U.S.C. 154(b) by 0 days.

(21) Appl. No.: 10/197,527

(22) Filed: Jul. 18, 2002

(65) Prior Publication Data

US 2003/0038925 A1 Feb. 27, 2003

(30) Foreign Application Priority Data

Aug. 17, 2001 (KR) ........................... 2001-50492

(51) Int. Cl.7 ............. G03B 21/56; G03B 21/14; G03B 37/00
(52) U.S. Cl. ............ 359/451; 359/443; 353/79; 352/69
(58) Field of Search ............... 353/77, 79, 99; 352/88, 89, 69; 359/443, 951

(56) References Cited

U.S. PATENT DOCUMENTS 5,433,670 A * 7/1995 Trumbull .................... 472/60
5,822,928 A * 10/1998 Maxwell et al. ............... 52/8
5,890,787 A * 4/1999 McNelley et al. ............ 353/28
5,964,064 A * 10/1999 Goddard et al. ............... 52/8
6,407,798 B2 * 6/2002 Graves et al. ................ 352/69
6,483,643 B1 * 11/2002 Zuchowski ................. 359/443

* cited by examiner

Primary Examiner—Russell Adams
Assistant Examiner—Michael Dalakis
(74) Attorney, Agent, or Firm—Bacon & Thomas, PLLC

(57) ABSTRACT

A visual and audio system for theaters includes a spherical screen having a desired radius of curvature while having a surface reflectivity of 5–50%, and a projector located at a focal point of the spherical screen. The curvature radius of the spherical screen corresponds to the projection distance of the projector. The image projected from the projector at the focal point of the spherical screen is reflected from the spherical screen in a horizontal direction. Accordingly, viewers can view images projected on the screen corresponding to 5–50 time the brightness of images viewed on conventional theaters screens. Central speakers are arranged at the focal point of the spherical screen, so that viewers perceive the sound effect as coming directly from the spherical screen. This visual and audio system can be effectively used in theaters for stereoscopic moves, theaters for high resolution images, and theaters for viewing of images at a higher brightness such as sports arenas, and restaurant theaters, etc.

3 Claims, 12 Drawing Sheets

VISUAL AND AUDIO SYSTEM FOR THEATERS

BACKGROUND OF THE INVENTION

1. Field of the Invention

The present invention relates to a visual and audio system for theaters, and more particularly to a visual and audio system for theaters which can achieve a remarkable improvement in brightness, visual presence, and resolution, while extending the field of visual presence to the entire screen area, and allowing viewers to experience a sound effect coming directly from the screen.

2. Description of the Related Art

Conventional visual and audio systems for theaters include a projector, a planar screen, and an audio system installed behind the planer screen.

Referring to FIG. 11, a conventional stereoscopic visual and audio system is illustrated. As shown in FIG. 11, the conventional stereoscopic visual and audio system includes a pair of projectors 2, polarizers 4 symmetrically arranged at the front of projection lenses respectively attached in the projectors 2 while defining a certain angle therebetween, and a planar screen 11. Viewers can view stereoscopic images from the projectors 2 projected onto the planer screen 11 through polarizing glasses 4 having a desired polarization degree.

The transmissivity of each polarizer 4 is 50% at maximum, and typically on the level of 40%. Accordingly, only 40% of the light emerging from the projector is transmitted through each polarizer 4, and then reached onto the planar screen 11. Also, only 40% of the resultant light is transmitted through the viewer's polarizing glasses 5. Finally, the viewer can see very dark screen images with only 16–25% brightness of the projected light.

Although it is possible to view stereoscopic images under the condition in which both the right and left images have a high brightness, this has not been accomplished due to the above-mentioned degraded brightness.

For this reason, many efforts to enhance the screen brightness for showing stereoscopic images have been made.

Referring to FIG. 1, a typical shooting procedure is illustrated. As shown in FIG. 1, the image of the object 6 is recorded through a shooting lens 7 on the film 10 or other image recording medium.

The object 6 is a three-dimensional one having substantial volume. But the three-dimensional image is recorded forcefully on the planar film surface 10 as a flat image which is obtained from a designed shooting angle, based on the reflecting of the shooting lens 7.

The image recorded on the Film 10 is subsequently projected onto a planar screen 11 using the projection lens 8 of the projector, as shown in FIG. 2. However, such an image planarization process becomes a main cause of deterioration of the desired visual presence.

Empirically, viewers in specific seats of the theater experience a greater visual presence than viewers in other seats.

The reason is, as shown in FIG. 2, that the image incident at upper, lower, left, and right areas of the planar screen 11 is reflected at a reflection angle ∠B identical to an incidence angle ∠A. In this case, viewers can perceive the visual presence of the shooting angle, but only in a scope A of reverse angles to the reflection angle ∠B. For this reason, the range of a viewing field in which the visual presence of the original object can be felt is narrow, so that viewers cannot perceive a satisfactory visual presence.

As shown in FIG. 3a, the image incident into the upper, lower, left, and right portions of the screen is reflected at a reflection angle ∠B, so that viewers can perceive visual presence based on an image depth captured upon the shooting of the image, only within a scope A of reverse angles to the reflection angle ∠B. The scope A of reverse angles is so very narrow that it corresponds to two seats, as shown in FIG. 3b.

In order to broaden the narrow field for the visual presence caused by the reflection angle ∠B, a method for maximizing scattering effects to obtain an increased uniformity of images may be used. In this case, however, it is necessary to reduce the reflectivity of the screen to 0.9–1.2%. For this reason, the screen is usable only in a dark room, and thus viewers do not see the desired image depth.

Gain is a unit representing the screen brightness and also represents the surface reflectivity of the planar screen 11. It is well known that 1 Gain equals a reflectivity of 1%.

According to the recent development of digital communications, sports broadcasts and live concerts, etc., are often relayed and televised in theaters. However, it is impossible to view these contents at a screen brightness adopted in typical theaters because the screen is too dark (the screen brightness is too low).

At the low screen brightness, it is impossible to obtain the satisfactory image depth and the desired color reproduction. For example, daylight scenes may look like night scenes. Due to a low contrast, there is little difference in color tone. For this reason, it is impossible to clearly display images.

In movie fields, many efforts to achieve an enhancement in brightness have been made in order to obtain the increased image depth. However, there is no way except intensifying the light source of the projector.

Particularly, when the distance between the screen and the seats is short, like in a small theater, the resolution of the screen is decreased so much that digital images with the visual presence cannot be applied to small theaters.

The Dolby system used as the theater sound facility is composed of a plurality of sound channels.

In the case of a Dolby system composed of 5.1 channels, two sets of speakers are arranged as front and rear stereo speakers, and a woofer for bass sound is arranged. Voices of actors and other sounds are outputted from central speakers 3.

The sound from the central speakers 3 is closely associated with the stereoscopic effect of images. In a conventional movie theater system illustrated in FIG. 4, central speakers 3 are located behind a planar screen 11. In this arrangement, a number of pores 9 are perforated through the planar screen 11 in order to forwardly transmit the sound from the central speakers 3 therethrough.

For this reason, the surface of the screen becomes rough, and the resolution and reflectivity of the screen are deteriorated, so that the brightness of the screen is lowered.

SUMMARY OF THE INVENTION

Therefore, the present invention has been made in view of the above problems, and it is an object of the present invention to provide a visual and audio system for a theater which is capable of extending the field in which the visual presence of an original image or object can be perceived, based on an image depth obtainable by a screen, to all seats in the theater, by increasing the brightness of the screen at least 5 times so as to implement projection of stereoscopic movies, by allowing viewers to view images at a bright place so as to show sports broadcasts at arena, live concerts relayed or televised on a screen at a concert, etc., by increasing surface resolution of the screen by at least 5 times so as to display clear images from a reduced distance for application to small-sized theaters, and by providing viewers with the effect that the sound from central speakers feels like it is coming directly from the screen.

In accordance with the present invention, this object is accomplished by providing a visual and audio system for a theater comprising: a spherical screen having a desired radius of curvature while having a surface reflectivity of 5–50%; at least one projector located at a focal point of the spherical screen, the projector comprising a film projector or a liquid crystal display projector; and seats arranged along a horizontal length of the spherical screen, whereby an image projected from the projector at the focal point of the spherical screen is reflected by the spherical screen in a horizontal direction, thereby causing a view field for viewing the image to be increased to a reverse angle range corresponding to the size of the spherical screen.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 5:
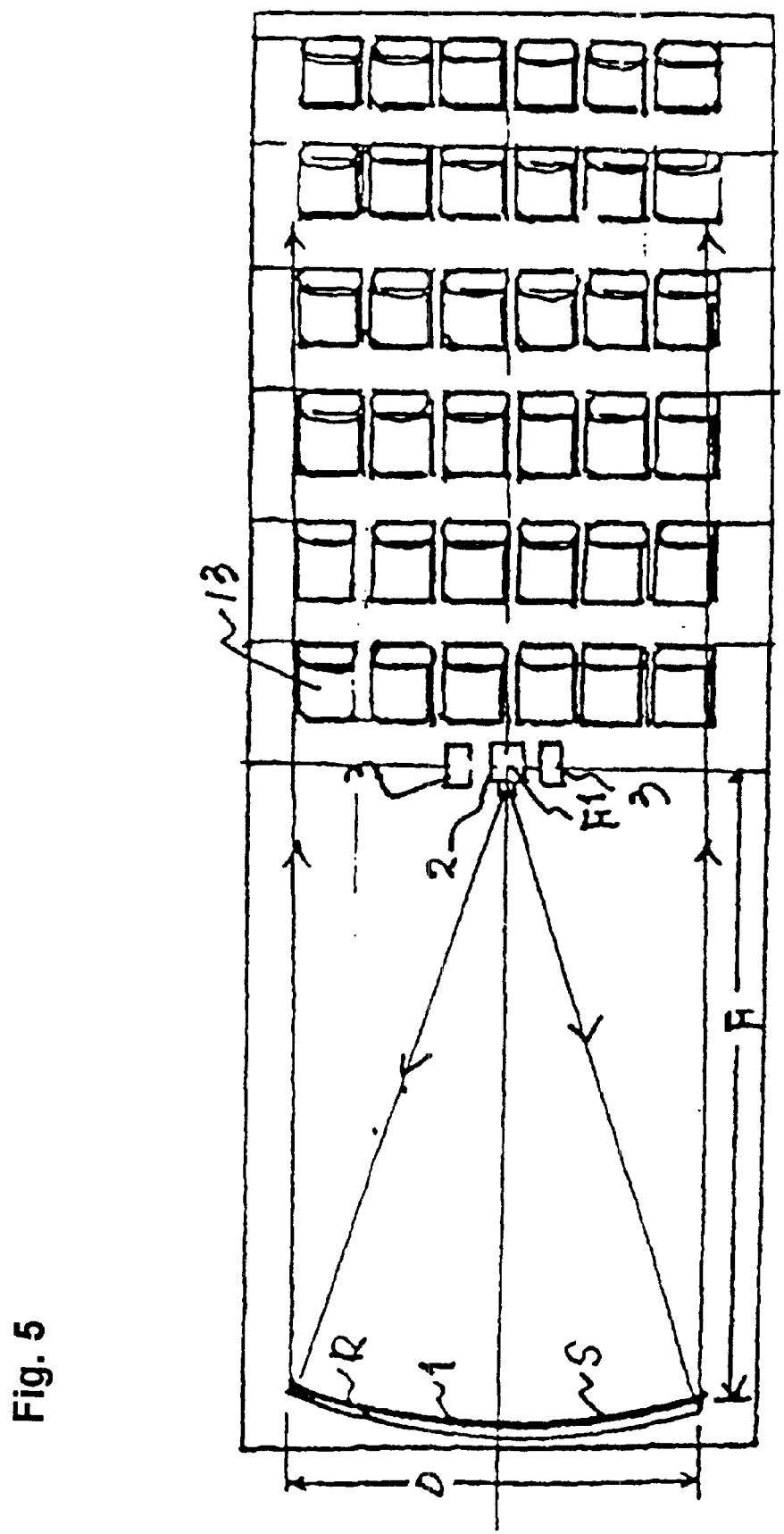
FIG. 5 is a schematic plan view illustrating a visual and audio system according to the present invention which is applied to the theater.
Figure 6:
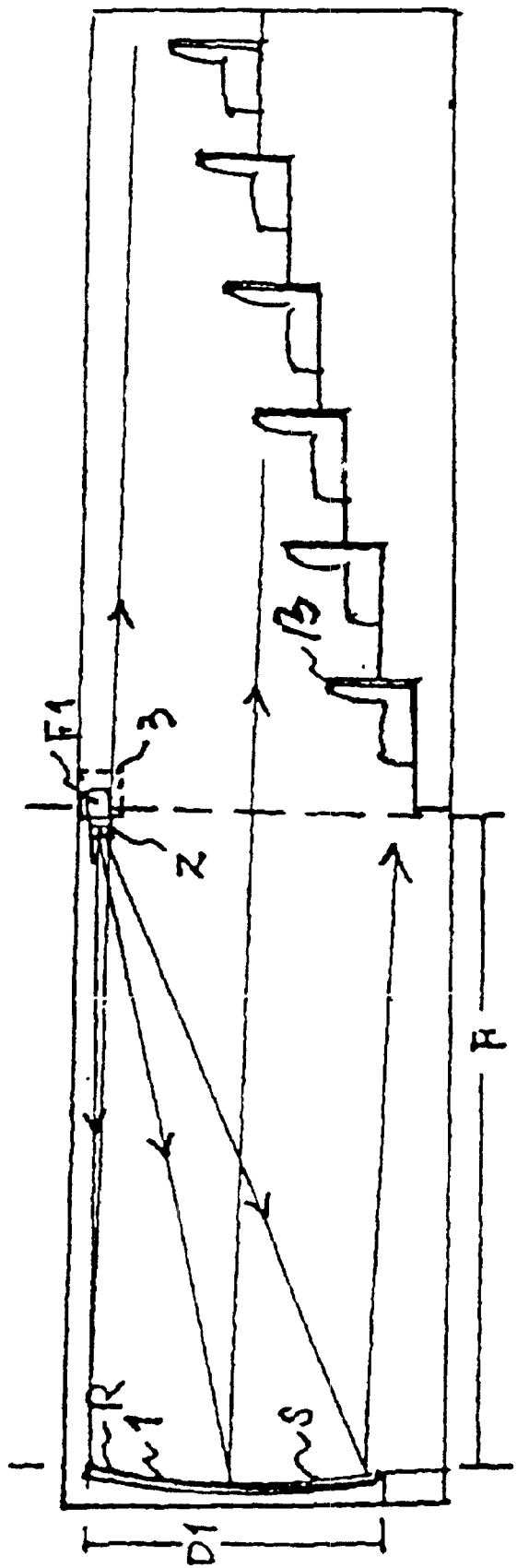
FIG. 6 is a schematic sectional view illustrating the visual and audio system of the present invention applied to the theater.

FIGS. 5 and 6 are a top view and a cross-sectional view, respectively, showing a visual and audio system according to the present invention which is applied to a theater. As shown in FIGS. 5 and 6, a spherical (concave) screen 1 as described below is arranged in the front wall of the theater. A projector 2 is located at the focal point F1 of the spherical screen 1. Central speakers 3 are arranged at both sides of the projector 2, respectively.

As shown in FIG. 6, seats 13 are laterally arranged along the horizontal length D of the spherical screen 1 while being vertically arranged along the vertical length D1 of the spherical screen 1.

Respective positions of the speakers are appropriately determined.

In accordance with the present invention, the projector 2 may be a projector using a film, a digital electronic medium such as a DVD, a VOD, a liquid crystal projector capable of receiving satellite broadcasting, or a DLP projector.

In the present invention, the optical configuration of the spherical screen 1, the optical relation between the spherical screen 1 and the projector 2, and the optical relation between the spherical screen 1 and the central speaker 3 are very important.

For better stereoscopic effect or image depth, the brightness of the screen must be enhanced. The brightness of the screen is proportional to the reflectivity of the screen.

In this regard, the reflectivity of the screen 1 at its surface S is set to 5–50% in accordance with the present invention.

When the reflectivity of the screen surface S is less than 5%, the quantity of reflected light is very small and thus optical function of the screen required in the present invention is poor. When the reflectivity of the screen surface S is more than 50%, the directivity of the screen is very high, so that viewing angle and contrast are decreased.

The reflectivity of the screen is controlled in the manner of controlling the reflectivity of the screen surface S. For example, the reflectivity of a reflecting surface coated with a reflective material such as aluminum is determined in accordance with the surface roughness (grain size) of the reflecting surface.

This will be described in more detail with reference to one example.

A reflecting surface is formed by applying an abrasive onto a glass surface, polishing the glass surface, and then depositing a reflective material such as aluminum onto the polished surface.

In this manner, a reflecting surface having a reflectivity of about 1%, which is a standard of typical screens, may be formed by polishing a glass surface with a 50–90 mesh emery used as an abrasive to obtain a surface roughness of 50–90 mesh, followed by depositing onto its surface a reflective material such as aluminum. To obtain a surface grain size of 100 Gains, which a mirror has, an abrasive having about 3,000 mesh is commonly used.

Generally, the relation between the surface particle degree of a screen and the reflectivity (Gain) index is as follows:

TABLE

| Surface Particle Degree (mesh) | Gain Reflectivity (%) |
| --- | --- |
| 3,000–1,500 | 100–50 |
| 1,500–750 | 50–25 |
| 750–375 | 25–12.5 |
| 375–180 | 12.5–6 |
| 180–90 | 6–3 |
| 90–50 | 3–1 |

This example is provided only for illustrative purposes, and the relation between the surface Particle degree and the reflectively index depends on the material of the reflecting surface and the properties of the used abrasive.

In accordance with the present invention, the reflectivity of the screen surface S is adjusted to 5–50%, considering the polishing process and the properties of the abrasive. Reflectivity may be simply measured with a illuminating apparatus.

Raising the reflectivity of the screen surface, however, does not always ensure improved screen functions.

Figure 2:
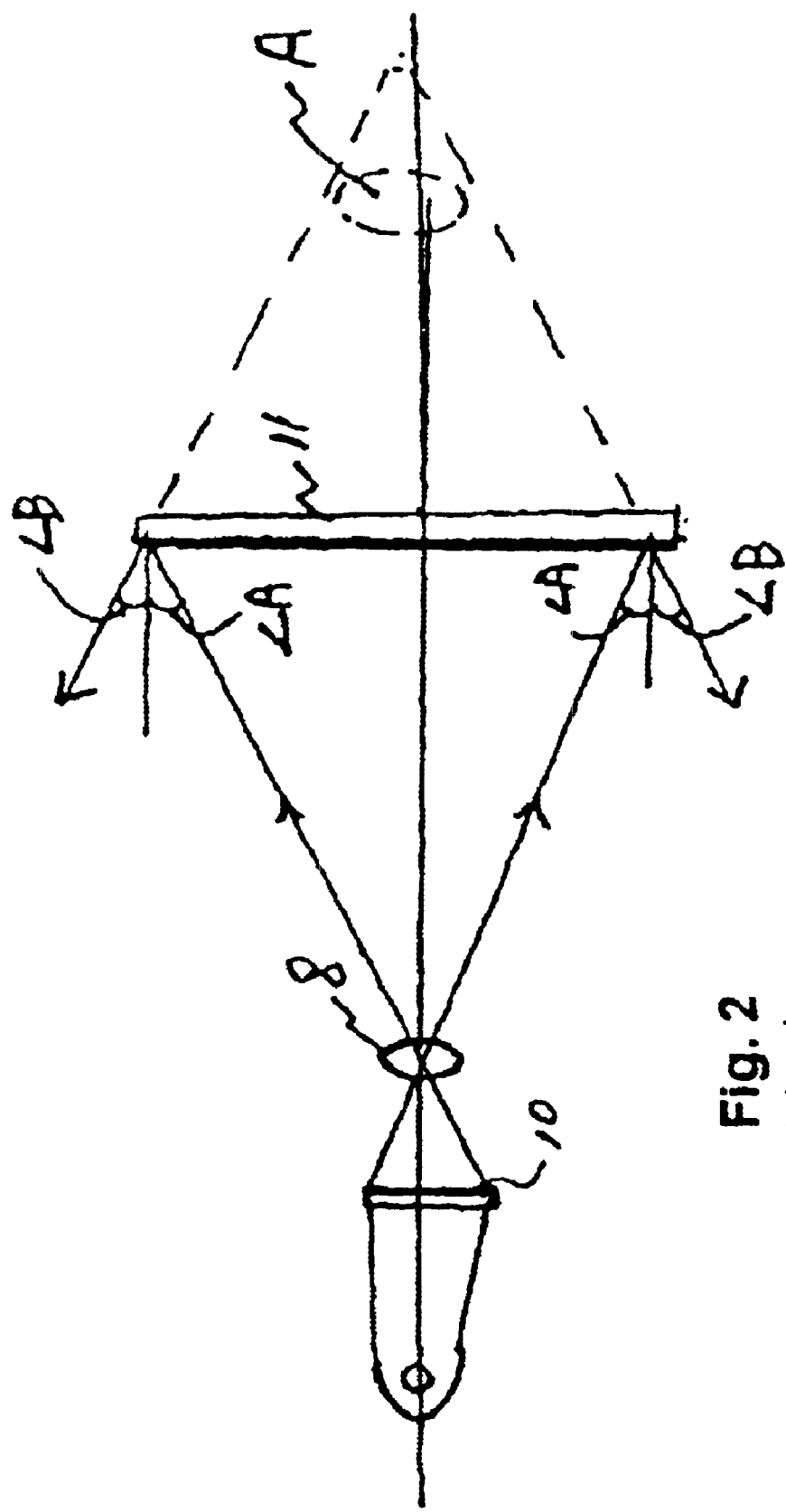
FIG. 2 is a schematic view illustrating a conventional image projection onto a planar screen.
Figure 3A:
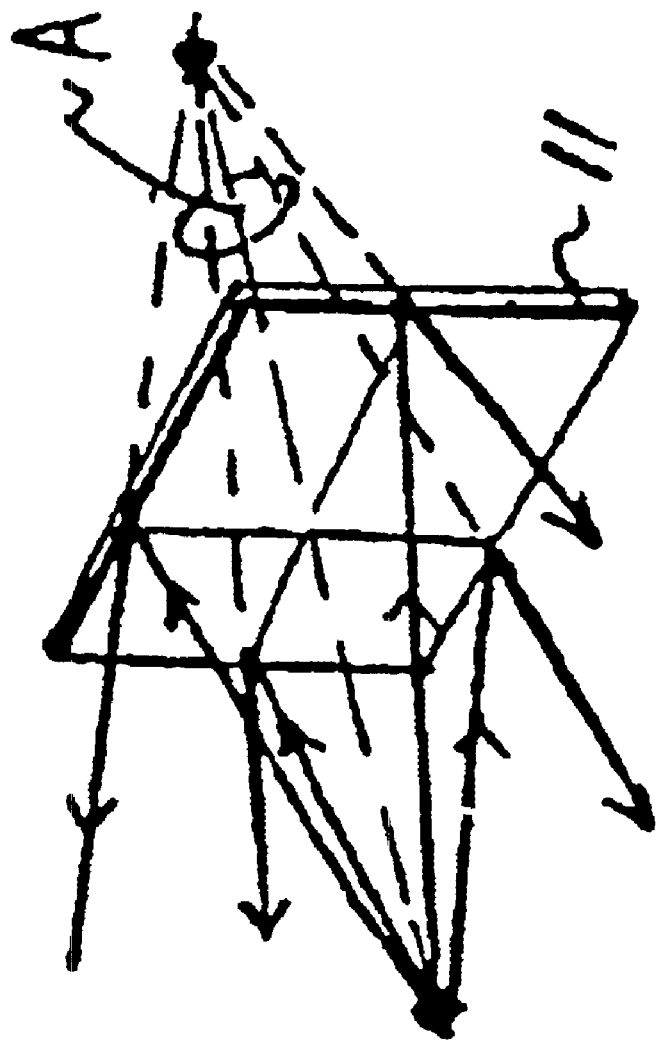
FIGS. 3a and 3b are schematic views respectively illustrating the field of the visual presence in a conventional case using the planar screen.
Figure 3B:
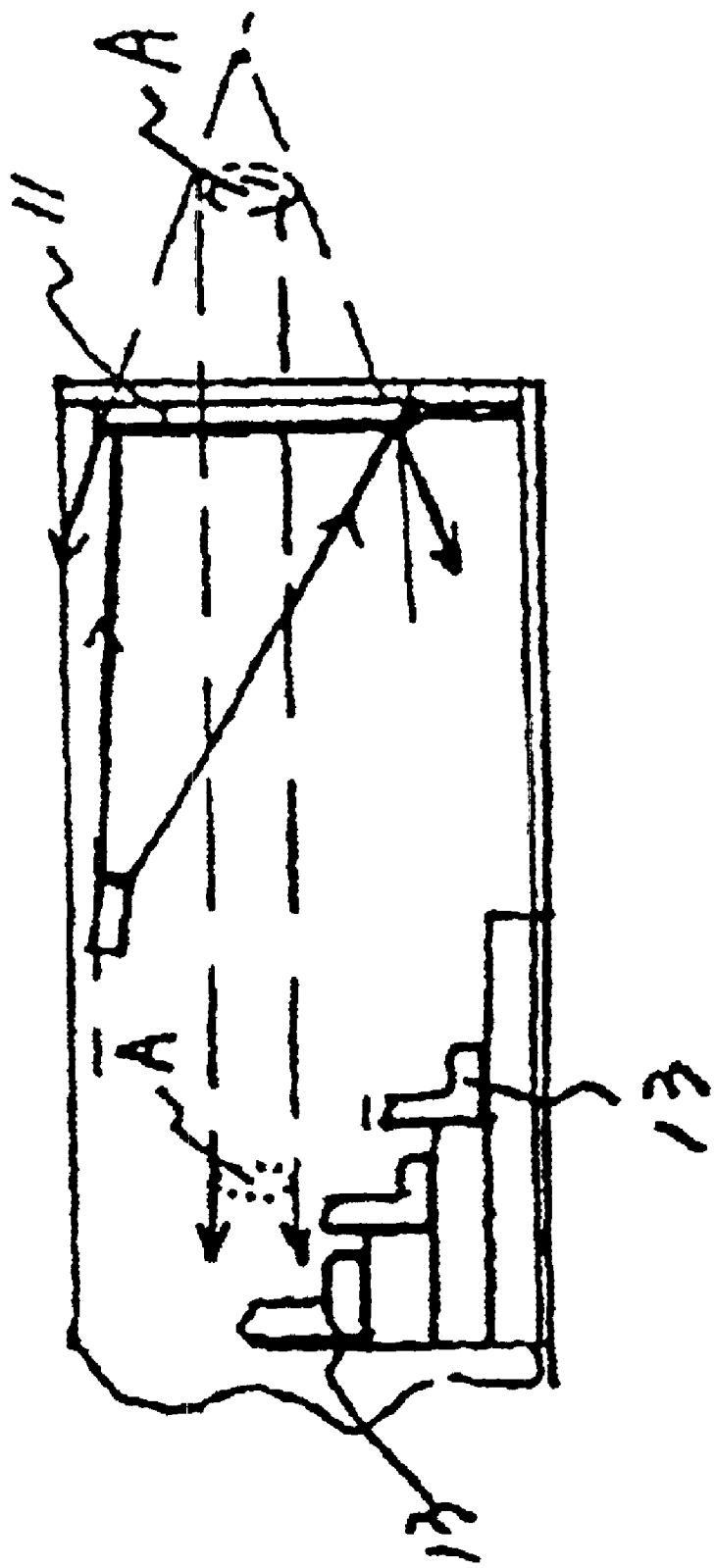

For example, in the case of a planar screen as shown in FIG. 2, when the reflectivity of the screen surface is raised in the planar screen, viewers may only view the defined image within the area A formed by the reflection angle ∠B according to the projection angle ∠A.

Figure 7:
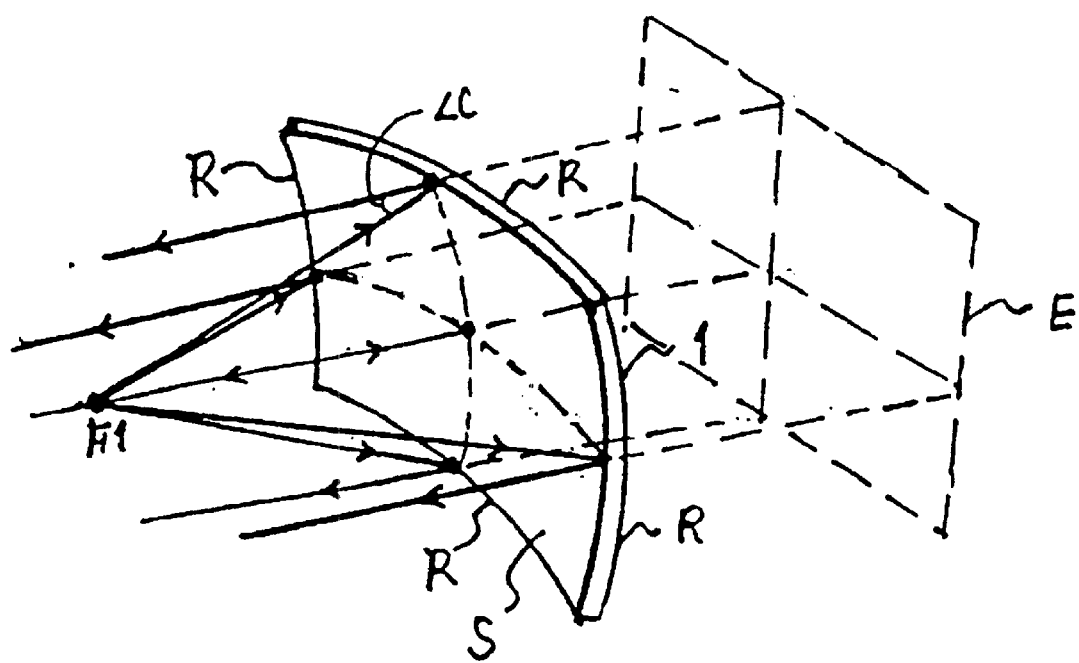
FIG. 7 is a schematic view illustrating an optical system using a spherical screen in accordance with the present invention.
Figure 8:
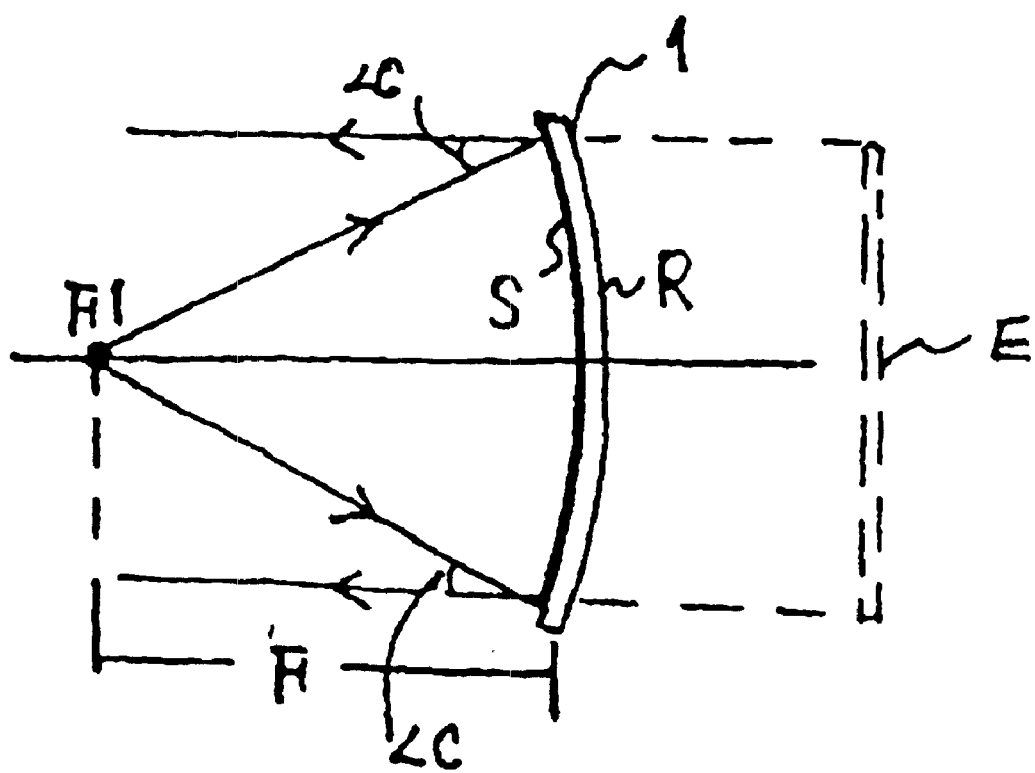
FIG. 8 is a schematic plan view illustrating the optical system using the spherical screen in accordance with the present invention.

To solve the above problem, the screen is configured to have a spherical (concave) shape, as shown in FIGS. 7 and 8.

However, such a spherical screen shape does not necessarily ensure a desired complete image viewing.

That is, images reflected from only a particular portion of the screen may be viewed, or the viewing area may become very narrow, unless a desired optical relation between the spherical surface of the screen and the projecting position of the projector 2 is established such that the focal length F of the spherical screen is equal to the projection distance of the projector 2.

Accordingly, the radius of curvature, R, of the spherical screen 1 is set to twice the projection distance of the projector 2.

For example, where the projection distance of the projector 2 is 16.5 ft (5 m), the curvature radius R of the spherical screen 1 is set to 33.1 ft (10 m) (10,000 m/m=10,000R).

The reason is that the mathematical relationship between the curvature radius R of the spherical screen 1 and the focal length F of spherical curvature R is given by the following equation: F=R/2.

When the projector 2 projects an image onto the spherical screen 1 under the condition in which it is arranged at the focal point F of the spherical screen 1, as shown in FIGS. 5 to 7, the image incident on the spherical screen 1 is reflected in a horizontal direction from the spherical screen 1. That is, there is no reflection corresponding to the reflection angle ∠B, which is formed in the case of a planar screen, because the reflection angle ∠B is offset by the incidence angle ∠A. In the arrangement according to the present invention, a horizontal reflection angle ∠C causing a horizontal reflection is established, as shown in FIG. 7. Accordingly, viewers can view an image corresponding to a scope E of reverse angles to the horizontal reflection angle ∠C, so that they can view the full picture of the image with the visual presence, projected onto the full portion of the screen.

Figure 1:
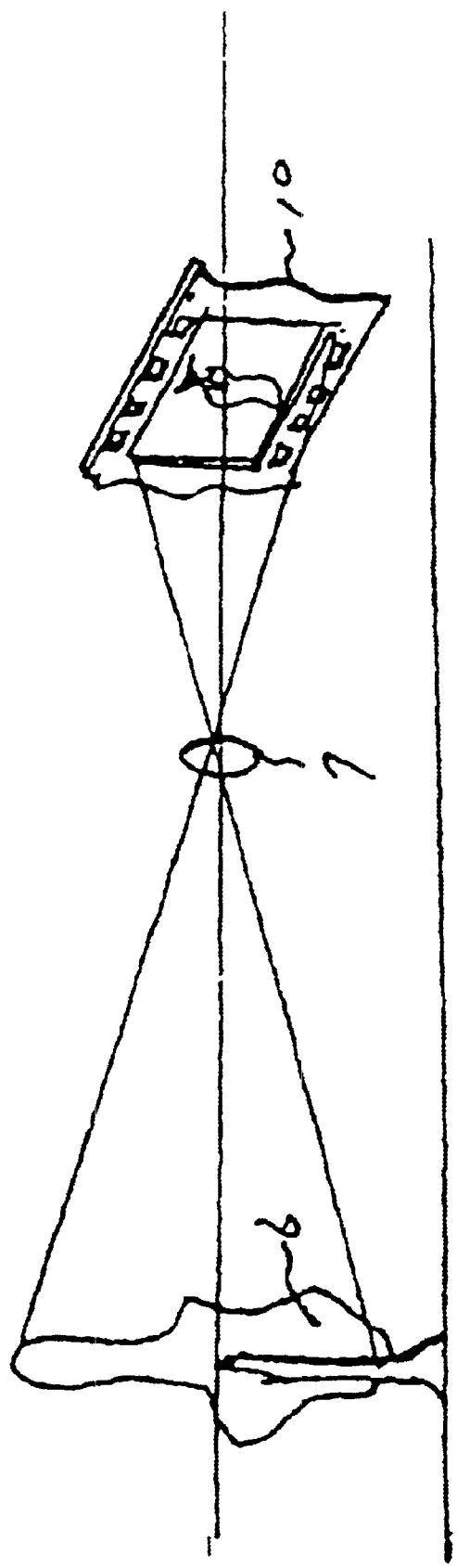
FIG. 1 is a schematic view illustrating a conventional shooting procedure.

Unlike the planar screen 11, the image projected from the projector 2 at the focal point F1 of the spherical screen 1 is horizontally reflected by the spherical screen 1. That is, there is no reflection corresponding to the reflection angle ∠B, which is formed in the case of the planar screen 11. Accordingly, viewers can view the full picture of the image with the visual presence, projected onto the full portion of the spherical screen 1 in the form of a spherical image at a viewing angle corresponding to the shooting angle of the image as shown in FIG. 1.

Also, viewers positioned within the lateral length D of the spherical screen 1 can view the image projected onto the spherical screen 1. At the same time, viewers in all seats can experience the image with the visual presence by virtue of the viewing angle enlarged to an angle identical to the shooting angle as shown in FIG. 1, and the concave depth of the spherical screen. From the shooting angle, viewers can experience the maximized visual presence.

Figure 10:
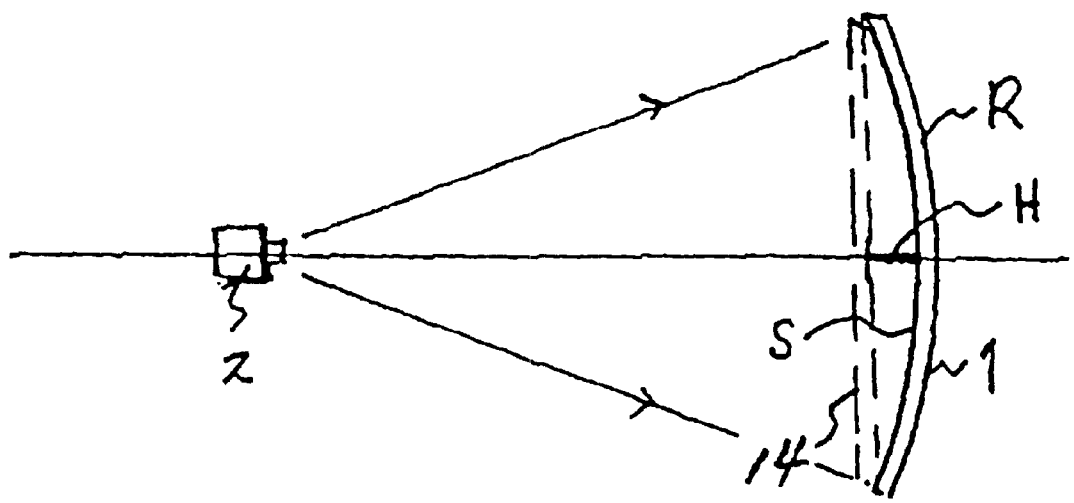
FIG. 10 is a schematic plan view illustrating a stereoscopic depth of the spherical screen according to the present invention.

As shown in FIG. 10, the image projected from the projector 2 onto the spherical screen 1 is enlarged by the curvature depth of the spherical screen 1, H, that is, the distance of the spherical surface of the spherical screen 1 from a virtual planar screen 14 arranged at the same position, as compared to the case in which the image is projected onto the virtual planar screen 14. Accordingly, an enhanced stereoscopic effect is obtained.

Next, a theater sound system according to the present invention will be explained.

Figure 4:
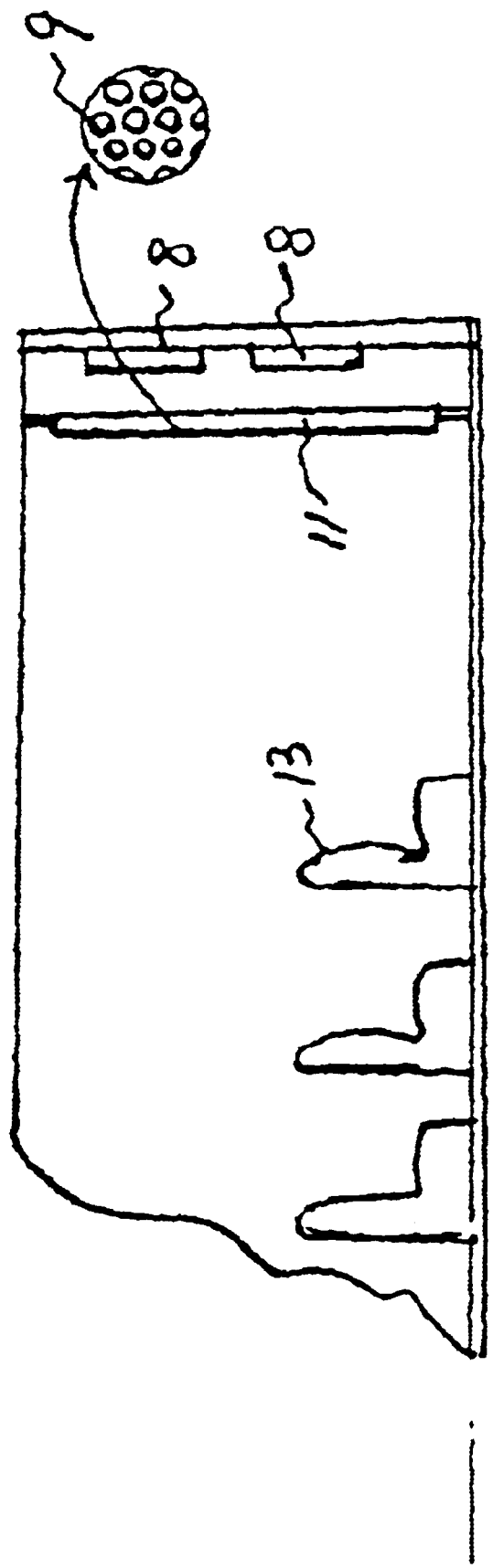
FIG. 4 is a schematic view illustrating an audio system and a screen used in a typical theater.

The surface S of the spherical screen 1 is very delicate in that it has a reflectivity of 5–50%. For this reason, where pores such as the pores 9 formed at the typical planar screen 11 of FIG. 4 are perforated through the spherical screen 1, they cause a degradation in picture quality, so that viewers cannot view the screen image. Therefore, holes or other modifications on the screen surface S cannot be made in the present invention.

It is well known that sound waves from a speaker have refraction and reflection characteristics similar to those of light, except for their velocities.

Figure 9:
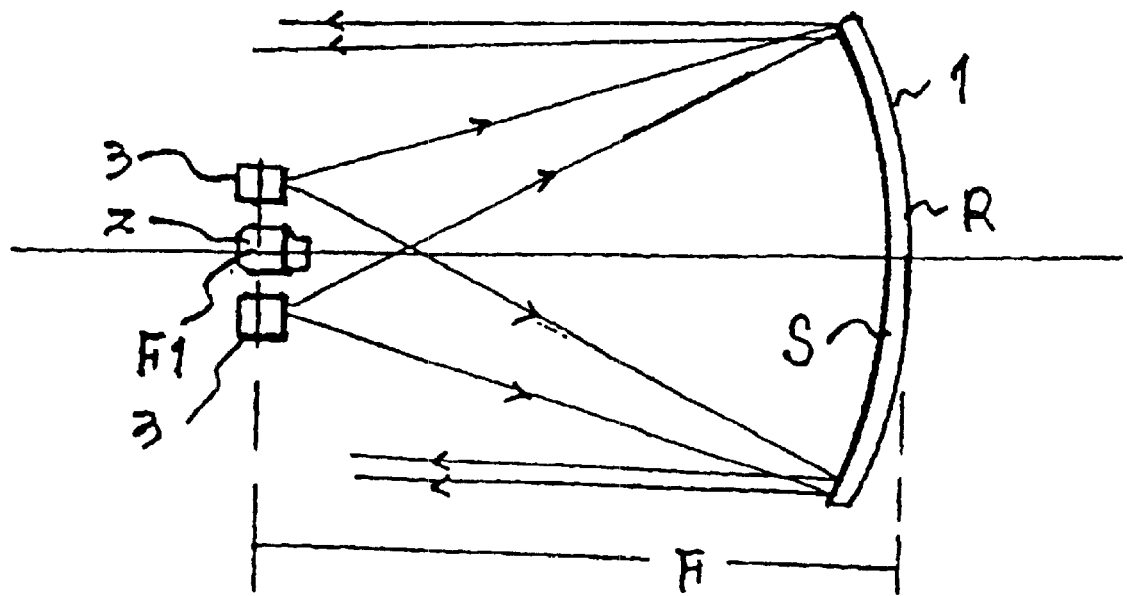
FIG. 9 is a schematic plan view illustrating an audio system according to the present invention.

Referring to FIG. 9, the central speakers 3 are arranged at right and left sides of the projector 2 positioned on the focal point F1 of the spherical screen 1, respectively.

In such an arrangement, sound from each central speaker 3 is directly reflected by the surface of the spherical screen 1, and thus viewers perceive the sound effect as coming directly from the screen.

Figure 11:
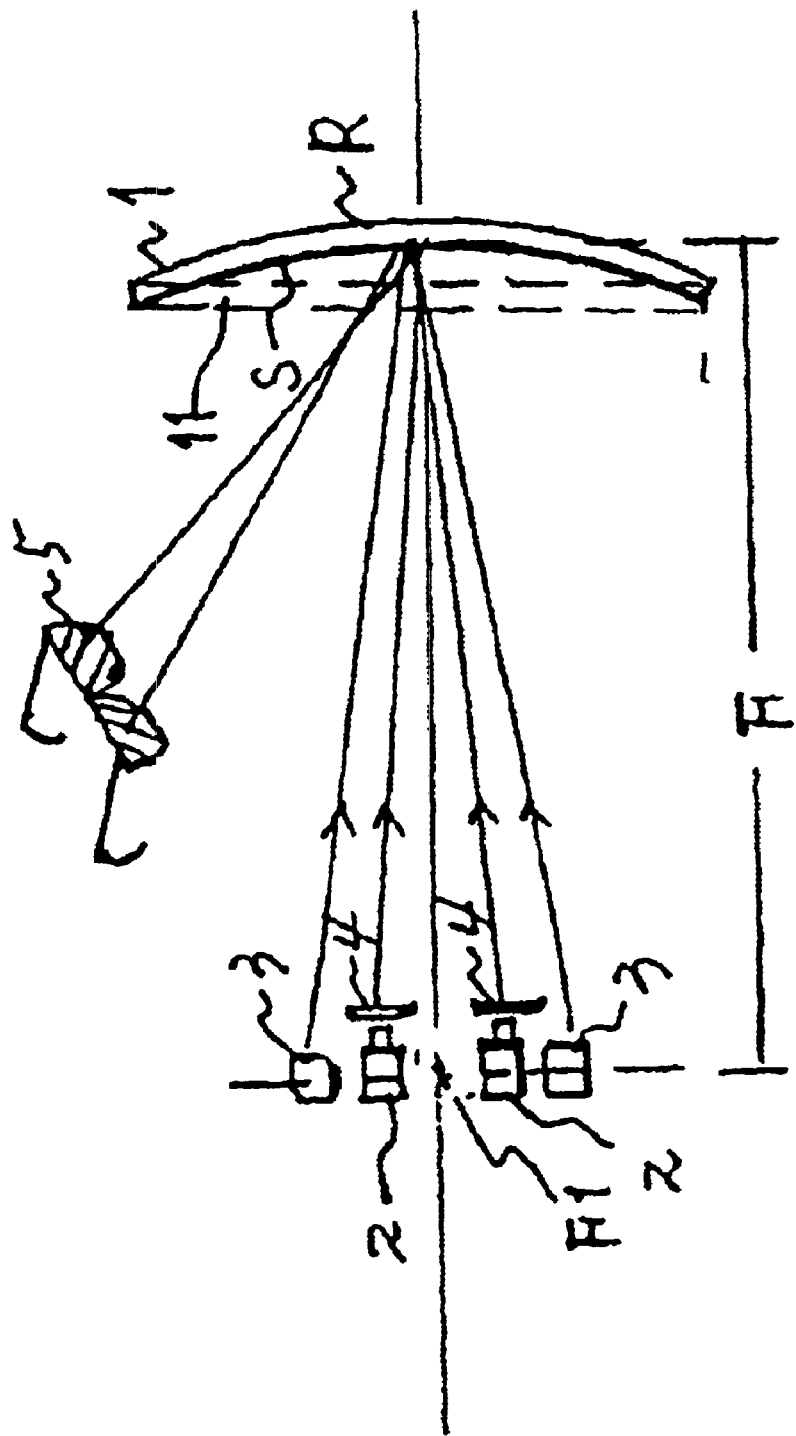
FIG. 11 is a schematic plan view illustrating a configuration of the visual and audio system for projection of stereoscopic images in accordance with the present invention.

When intended to project the image with the visual presence, as shown in FIG. 11, a plurality of projectors 2 are arranged within the scope of the present invention.

Referring now to FIGS. 5 and 6, an example of the present invention will be described.

EXAMPLE

1) Size of the spherical screen 1: 12.4 ft (376 cm) (horizontal)×5.29 ft (160 cm)(vertical) (2.35:1), the screen size: diagonal≈185"

2) Surface reflectivity S of the spherical screen 1: 20% (20 Gains)

3) Projection distance F when an image from the projector 2 is projected onto the spherical screen 1 having a diagonal size of 185":19.8 ft (6 m)

4) Curvature Radius R of the spherical screen 1: 39.6 ft (12 m)(1,2000R)

5) Distance F1 between the spherical screen 1 and the projector 2: 19.8 ft (6 m)

6) Distance between the spherical screen 1 and each central speaker 3: 19.8 ft (6 m)

7) Horizontal length D along which the seats 13 are horizontally arranged: 12.4 ft (376 cm)

8) Vertical length D1 along which the seats 13 are vertically arranged: 5.29 ft (160 cm)

The screen ratio typically adopted in a general theater is 2.35:1. Therefore, the spherical screen 1 is a large-size screen having a diagonal length as long as 185".

The reflectivity of the screen surface S of the spherical screen 1 is 20% (20 Gains), which corresponds to the reflectivity of 5–50% of the screen surface S, and 20 times brighter than typical screens.

Since the curvature radius R of the spherical screen 1 is 39.6 ft (12 m) (12,000 R), whereas the projection distance F of the projector 2 is 19.6 ft (6 m), the focal length of the spherical screen 1 is equal to the projecting length F.

Accordingly, it is possible to reflect the image incident on the spherical screen 1 in a horizontal direction from the spherical screen 1 by locating the projector 2 at the focal point F1 of the spherical screen 1.

Since the central speakers 3 are arranged at the focal point F1 of the spherical screen 1, the sound from the central speakers 3 is also reflected from the spherical screen 1 in a horizontal direction toward viewers. Thus, the sound effect coming directly from the screen 1 is attained.

The horizontal length of the spherical screen 1 is 12.4 ft (3.76 m), and 6 seats can be placed in a line, in terms of a width 2 ft (60 cm) occupied by each seat. Since the directivity of the screen 1 according to the present invention is very high, the maximum viewing length is extendable to 330 ft (100 m), and thus 60–240 seats can be placed in terms of 10–40 rows provided in the theater.

Furthermore, since the screen surface S of the screen 1 has 20 Gains while having a surface particle degree of 375 mesh, it is possible to accomplish a high resolution corresponding to 4 times that of the conventional screen, which has 1 Gain while having a surface particle degree of 90 mesh. Accordingly, viewers can view stereoscopic images even from a distance 75% closer to the screen.

As apparent from the above description, the present invention provides the visual and audio system for theaters which includes a spherical screen 1 having a surface S with a reflectivity of 5 to 50% while having a desired radius of curvature, and a projector 2 arranged at a focal point of the spherical screen 1, so that an image from the projector 2 incident on the spherical screen 1 is reflected from the spherical screen 1 in a horizontal direction. Accordingly, the visual and audio system of the present invention enables viewers to view images at a brightness corresponding to 5–50 times the brightness of conventional cases.

The spherical screen 1, as shown in FIG. 10, has an increased screen area, as compared to planar screens, because it has a certain radius of curvature. In particular, the image projected onto the spherical screen has a depth corresponding to the depth H of the spherical screen 1 defined by the curvature of the spherical screen 1. Also, an illusion effect is provided by the lens used in the visual and audio system. Accordingly, an increased stereoscopic effect is obtained.

An increased image depth effect may be obtained by reducing the projecting length of the projector 2, and correspondingly reducing the curvature radius R of the spherical screen 1. In this case, of course, a projection lens having a correspondingly reduced projection length should be used.

Also, in this case, the optical arrangements of the spherical screen 1 and projector 2 should be included under the concept of the present invention.

As shown in FIG. 11, the visual and audio system according to the present invention may use two projectors 2 respectively projecting images onto the left and right portions of the spherical screen 1, in order to achieve the 3D (Three Dimentional) movie projection. In this case, the 3D effects of the projected left and right images are increased. Accordingly, the visual and audio system provides a remarkably increased 3D effect.

Thus, in accordance with the visual and audio system of the present invention, viewers can view 3D images at a screen brightness corresponding to 5–50 times the brightness used in conventional cases, while in typical screens, only 16% of projected light is viewable. Accordingly, the visual and audio system of the present invention enables viewing of sports broadcasts, live concerts relayed or televised on the screen, etc. in a brighter space. In addition, this visual and audio system allows the theater, in which the visual and audio system is installed, to be modified in the form of a restaurant theater.

According to the present invention, the screen 1 has a spherical screen structure, and seats are arranged along the horizontal length D of the spherical screen 1 so as to extend the field of the visual presence to the extent corresponding to the entire area of the spherical screen 1, as compared to conventional cases providing a limited field of the visual presence due to use of a planar screen. In accordance with the present invention, central speakers 3, the positions of which are associated closely with the stereoscopic effect of images, are located at the focal point F1 of the spherical screen 1. In this arrangement, the sound emitted from the central speakers 3 is reflected by the surface S of the spherical screen 1 in a horizontal direction, so that it is possible to perceive a sound effect coming directly from the spherical screen 1 without perforation of air pores 9 through the spherical screen 1.

Accordingly, the visual and audio system of the present invention can be effectively used in digital theaters for projection of digital images, small-sized theaters such as multiplex theaters, theaters in schools and working places, and restaurant theaters.

Although the preferred embodiments of the present invention have been disclosed for illustrative purpose, those skilled in the art will appreciate that various modifications, additions and substitutions are possible, without departing from the scope and spirit of the invention as disclosed in the accompanying claims.

What is claimed is:

1. A visual and audio system for a theater comprising:
   a spherical screen having a desired radius of curvature while having a surface reflectivity of 5–50%;
   at least one projector located at a focal point of the spherical screen, the projector comprising a film projector or a liquid crystal display projector; and
   seats arranged along a horizontal length of the spherical screen,
   whereby an image projected from the projector at the focal point of the spherical screen is reflected from the spherical screen in a horizontal direction, thereby causing a view field for viewing the image to be increased to a reverse angle range corresponding to the size of the spherical screen.

2. The visual and audio system according to claim 1, wherein the at least one projector comprises a plurality of projectors for projecting a stereoscopic image.

3. The visual and audio system according to claim 1 or 2, further comprising:
   at least one central speaker arranged at the focal point of the spherical screen, whereby sound emitted from the central speaker is reflected by the spherical screen simultaneously with the reflection of the projected image.

* * * * *